Feb. 4, 1969  C. F. SALFER  3,425,151
AUTOMATIC RELEASING FISHLINE FLOAT
Filed June 2, 1967
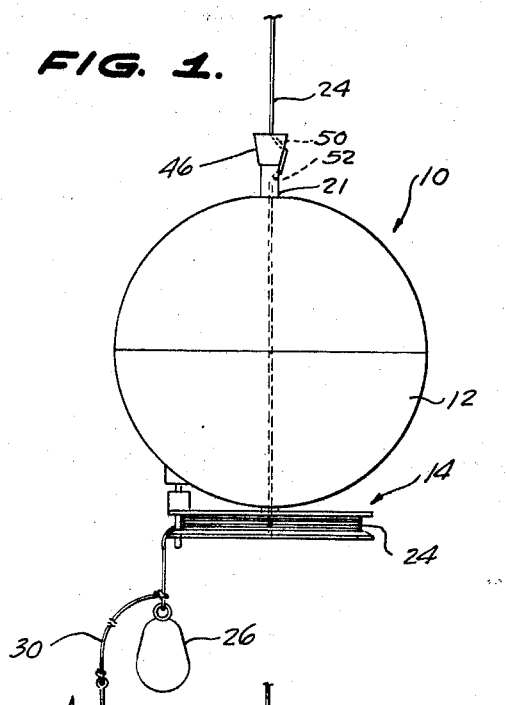
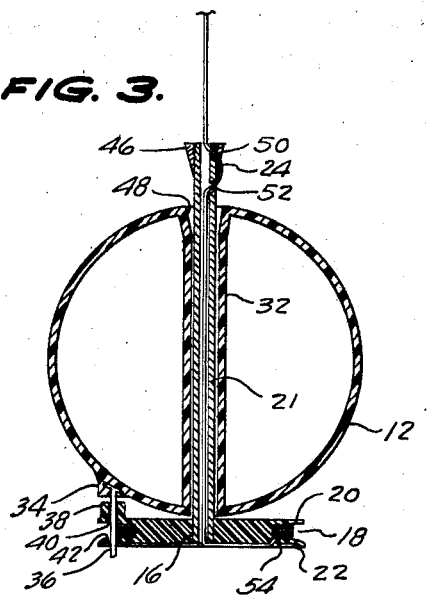
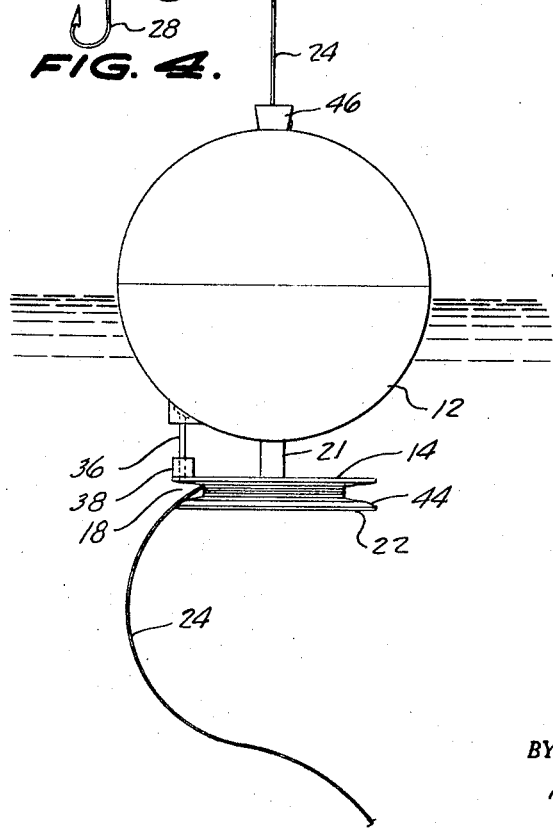
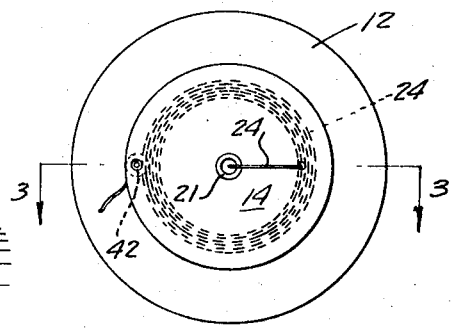
INVENTOR.
CLINTON F. SALFER,
BY Berman, Davidson & Berman
ATTORNEYS.

United States Patent Office 3,425,151
Patented Feb. 4, 1969

3,425,151
AUTOMATIC RELEASING FISHLINE FLOAT
Clinton F. Salfer, 422 2nd Ave., Havre, Mont. 59501
Filed June 2, 1967, Ser. No. 643,282
U.S. Cl. 43—43.11         6 Claims
Int. Cl. A01k 93/00

ABSTRACT OF THE DISCLOSURE

An automatic releasing fishline float has a spool having a central bore and with an upstanding hollow stem secured in the bore of the spool. The float also has a bore slidably receiving the stem for movement therealong. The spool has aligned apertures in its rims to receive a pin mounted on the float to prevent rotation of the float with respect to the spool and to retain a preselected length of fishline wound on the spool. The stem is provided with a stop at its upper end which limits the drop of the spool after the float strikes the surface of a body of water, the drop movement freeing said pin from the spool groove to release said length of fishline.

---

This invention relates to fishing gear, and more particularly to an improvement in an automatic releasing fishline float adapted to be cast on a body of water, of any depth, and to thereupon release a predetermined length of fishline to a desired fishing depth.

It is desirable to provide equipment for fishing in waters of varying depths and varying temperatures, which will place and maintain the baited hooks, or lures, at a chosen depth for increasing the catch. Float control devices for this purpose and which release a given length of fishline below the surface are known. These conventional devices, however, are generally of complex structure, difficult and expensive to make and use, and impositive of action.

It is a primary object of the present invention to provide an improved automaitc releasing fishline float which obviates the defects of conventional devices of this nature.

It is an important object of the invention to provide an improved automatic releasing fishline float which is of simple construction, easy and inexpensive to fabricate and use, and positive of action.

Another object of the invention is to provide an improved depth control device, having the above described characteristics, and which employs a float mounting a movable thin spool for retaining a predetermined wound length of fishline selected to achieve the desired depth of fishing, means being provided to retain the wound length of line on the spol until the device is cast upon a body of water, whereupon the spool drops to release said means permitting the selected length of line to unwind.

A further object of the invention is to provide an improved depth control device for a fishing line, having the above described characteristics, in which the spool is provided with an upstanding stem slidably received in a bore of a float, the upper end of the stem having a stop which limits the downward motion of the spool to a distance just sufficient to free the line releasing means.

A still further object of the invention to to provide an improved depth control device for a fishing line, having the above described characteristics, wherein the fishing-line is led to the spool through the top of the hollow stem, through a passage in said stop to the exterior surface of the stop and back to the hollow stem, so that when the spool drops, the fishing line as well as the stop are engaged by the float to positively lock the fishing line and prevent the feeding of any additional line over and above that already wound on the spool.

The novel features that are considered characteristic of the invention are set forth with particularity in the appended claims. The invention, itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIG. 1 is a side elevation of an automatic releasing fishline float according to the invention;

FIG. 2 is a bottom plan view of the device illustrated in FIG. 1;

FIG. 3 is a vertical sectional view taken on line 3—3 of FIG. 2 and looking in the direction of the arrows; and FIG. 4 is an elevational view similar to FIG. 1, but showing the parts of the device in their working positions as assumed after the float strikes the water to release the fishing line from the spool.

Referring now more particularly to the drawing, the improved depth control device, generally indicated at 10, is illustrated as comprising two main components, a spool 14 and a float 12.

The spool is preferably a relatively thin disc having a central bore 16 and a peripheral groove 18 defined by upper and lower rims 20, 22. A predetermined, or preselected, length of fishing line 24 is wound on the spool in said groove, said length being selected, dependent upon environmental conditions and the characteristics of the water in which the fishing is to take place, to pay off the line to the desired fishing depth. The line is weighted by a sinker 26, and a hook 28 is attached by a lead 30 to the bottom of the line near the weight.

While other shapes and forms may be utilized, a preferred form of the float 12 constitutes a hollow sphere formed of plastic, hard rubber, metal, or other suitable material. Vertically disposed along a diameter of the float is a hollow sleeve 32 forming a bore through the float. The sleeve is adhered by glue, welding, or in any other suitable manner, at its ends to the wall of the sphere at apertures therein in such manner as to seal the sphere against inflow of water. An upstanding hollow stem 21 is fixed to the spool 14 in the bore 16 thereof and is slidably received in the float sleeve 32.

A small projection 34 is formed on, or adhered to, the surface of the sphere to receive and fixedly support a dependent pin 36. The upper rim 20 of the spool is provided with an integral collar 38. If desired, this collar may be separately formed and secured to the spool. The bore of the collar is aligned with a pair of apertures 40, 42, respectively, passing through the upper and lower rims of the spool so that the collar and the aperiures receive the pin 36 which, in the casling position of the float control device, crosses the groove of the spool and prevents the unwinding of the fishline therefrom. This condition of the device is illustrated in FIGS. 1 and 3. When, however, the device is cast upon the water surface, the parts will take the position shown in FIG. 4, in which the spool drops so that the pin no longer obstructs the spool groove, and the preselected length of fishline wound in the groove 18 automatically unwinds due to the gravity of the sinker, paying out the hook to the selected depth. To facilitate such unwinding, the upper surface of the lower rim 22 in rounded downwardly and outwardly as indicated at 44, reducing the friction of the unwinding line.

To limit relative dropping movement of the spool with respect to the float when the line is to be released from the spool, and to retain the pin 36 within the collar 38 during such unwinding, the stem 21 is provided with an inverted frusto-conical stop 46 threaded on its upper end. Desirably, the upper end of the sleeve 32 is flared outwardly to conform in conical shape with said stop as shown at 48. Accordingly, when the spool drops to its position of FIG. 4, it is held in this position purely by the wedging action of the stop 46 in the flared portion 48 of the sleeve of the float.

In feeding the fishing line to the spool when winding the preselected length thereon, the line 24 is led into the open upper end of the stem 21 through a passage 50 in the wall of the stem and the wall of the stop to the exterior surface of the stop, back through a second passage 52 in the wall of the stem to the hollow interior. The line is then led down through the hollow stem 21 and out of the open bottom thereof, across and under the spool and up through an opening 54 in the lower rim 22 of the spool to begin the layers of winding in the groove of the spool. The passages 50, 52 at the upper end of the stem and through the stop pass a short length of the fishing line to the outside surface of the stop to be engaged between the stop and the tapered portion 48 of the float sleeve to lock the line at this point, ensuring against any possibility of feeding a greater length of fishing line from the spool than was previously selected. The locking of the line at the surface of the stop, no matter how much drag there may be in the sinker or in the force of a fish striking the hook, makes certain that the line will not be pulled through the stem of the float to increase the depth of the sinker and hook.

The mode of use and operation of the depth control device will be readily apparent from the above description. The fishing line is threaded through the device, in the manner described above, until a selected length for depth of fishing extends below the float and spool. This length is threaded through the aperture 54 and wound on the spool, the spool being then pushed upwardly over pin 36 and held in the condition while the sinker and hook are tied to the free end. The upper end of the fishing line 24 is secured to any suitable fishing gear, such as a casting pole, and the depth control assembly will then be held with the parts in their relative positions shown in FIGS. 1 and 3 by the tension exerted upwardly on the upper end of the line. When the line is cast onto the surface of the body of water being fished, the float will submerge only partially, and the weight of the selected line length plus the sinker will cause the stem 21 and spool 14 to drop the short distance permitted by stop 46 so that the spool takes the position illustrated in FIG. 4. This removes pin 36 from across the spool groove 18 and the portion of the line 24 wound on the spool will automatically unwind without turning the spool merely by gravity force exerted by the sinker continuing to descend. Thus, the hook 28 will drop to the preselected level, the upper end of the line 24 being locked at the stop 46 by engagement between the stop and the tapered portion 48 of the float sleeve 32. If, at a later time, it is desired to increase the depth of fishing, the stem and stop may be lifted and additional line payed out, for winding on the spool, by manipulating the line across the surface of the stop. Obviously, the line may be withdrawn from the device in the same manner to provide a lesser preselected depth of fishing.

What is claimed is:

1. An automatic releasing fishline float comprising in combination, a spool having a central bore and a peripheral groove defined by upper and lower rims, an upstanding hollow stem secured in said bore, a float having a bore slidingly receiving said stem for movement therealong, a depending pin on said float received in aligned apertures in the upper and lower spool rims, and a stop on the upper end of said stem adapted to engage said float and arrest its upward motion on the stem at a level which elevates said pin from the aperture in the lower spool rim while retaining the lower end of the pin in the aperture of said upper spool rim.

2. An automatic releasing fishline float according to claim 1 wherein is provided a channel, for a fishing line, which extends into the upper end of said hollow stem, through the stop to its exterior surface, back into the hollow stem, out of the bottom thereof, under the spool and upwardly through an opening in the lower spool rim to the spool groove, whereby engagement of the stop with the float also serves to engage and lock a fishing line between the exterior surface of the stop and the float.

3. An automatic releasing fishline float according to claim 2 wherein the upper surface of said lower spool rim is rounded outwardly and downwardly to permit ready release of a fishing line wound in the spool groove.

4. An automatic reelasing fishline float according to claim 2 wherein said stop comprises an inverted truncated pyramid secured on the upper end of said stem, the bore of said float being enlarged and of similar pyramidal form to wedingly receive said stop.

5. An automatic releasing fishline float according to claim 2 wherein said float is a hollow sphere whose bore is defined by a diametrically positioned vertical tube sealingly secured to the wall of the sphere so as to prevent ingress of water.

6. An automatic releasing fishing line float according to claim 2 wherein a collar is secured to the upper rim of the spool, the bore of the collar being alinged with said apertures in the spool rims and serving to guide said pin during release movements of the spool and the float.

References Cited

UNITED STATES PATENTS

| 779,937 | 1/1905 | Holt | 43—43.11 |
| 2,669,054 | 2/1954 | Smith | 43—43.11 |
| 3,106,034 | 10/1963 | Jonassen | 43—43.11 |
| 3,144,729 | 8/1964 | Jonassen | 43—43.11 |

SAMUEL KOREN, *Primary Examiner.*

JAMES H. CZERWONKY, *Assistant Examiner.*

U.S. Cl. X.R.

43—44.91